United States Patent Office 2,957,361
Patented Oct. 25, 1960

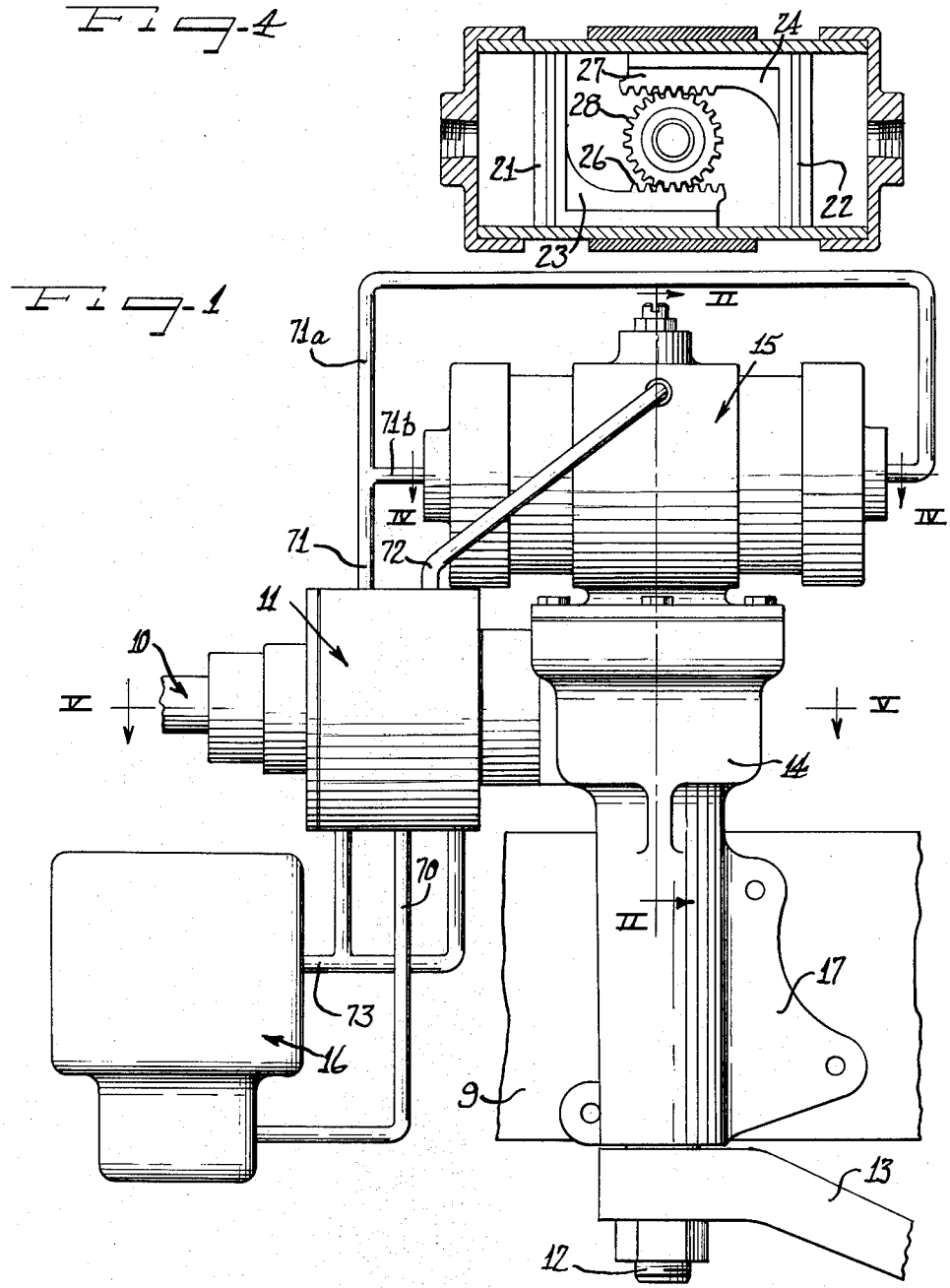

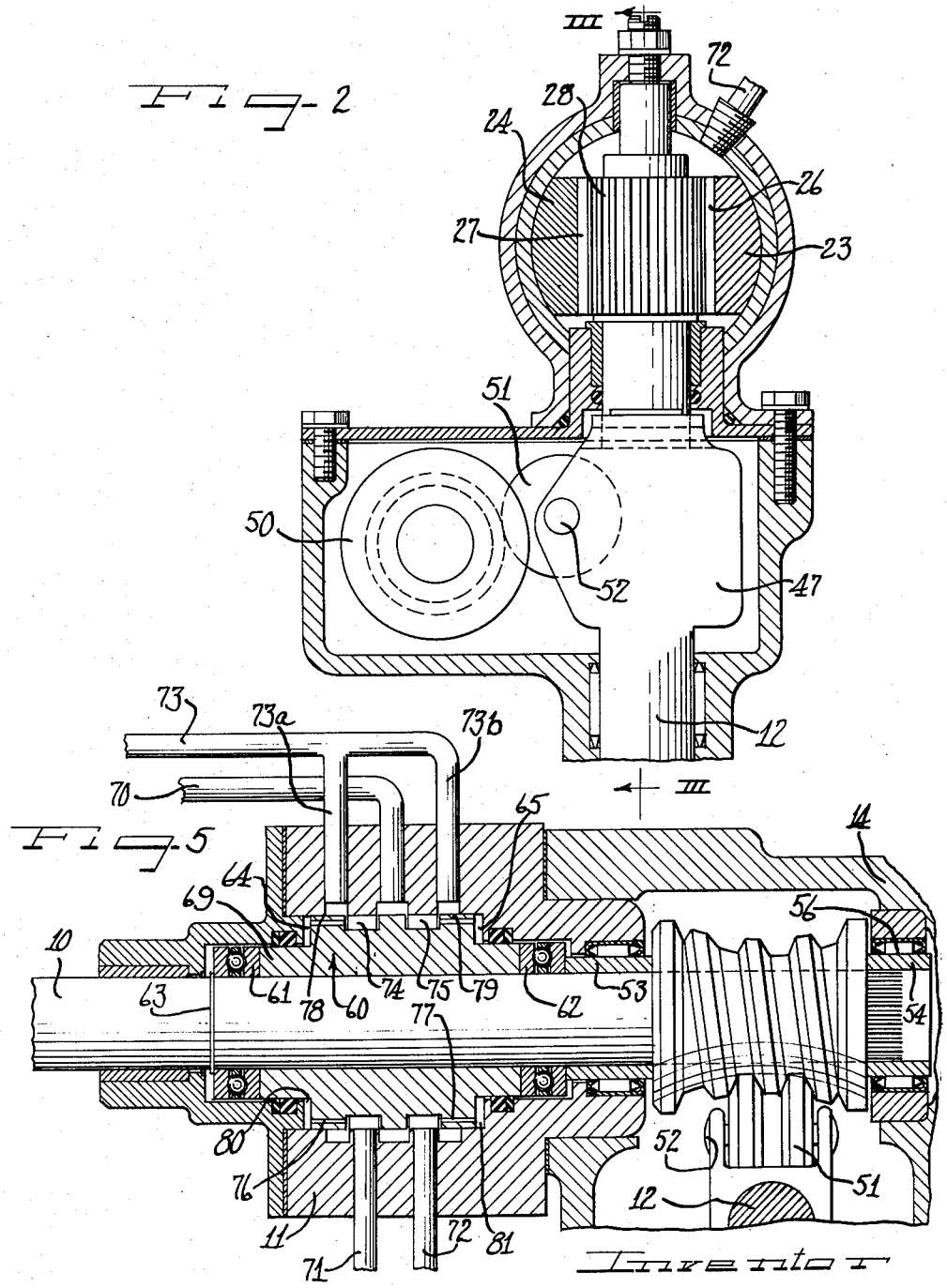

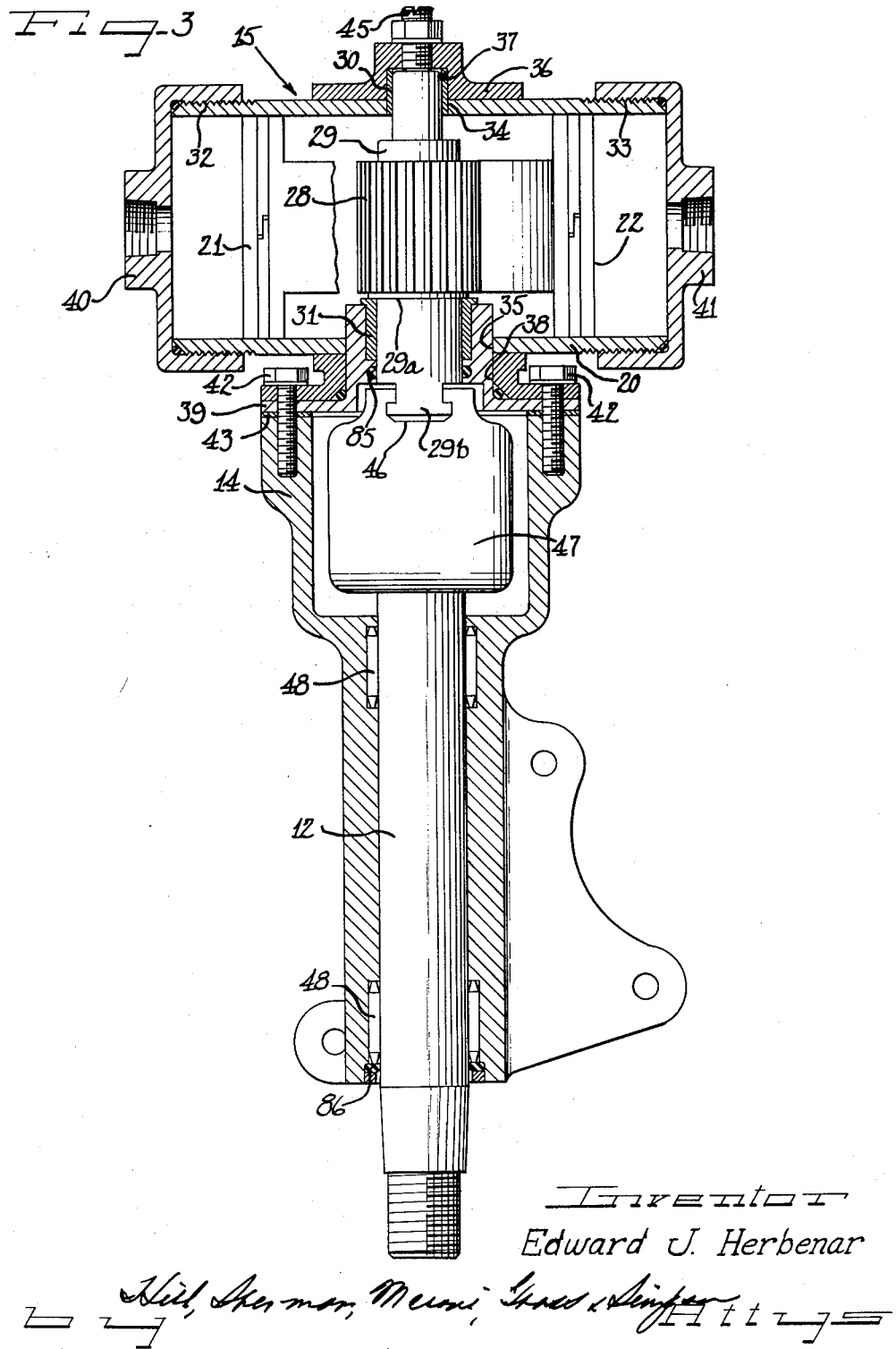

2,957,361

POWER STEERING ATTACHMENT

Edward J. Herbenar, Detroit, Mich., assignor to Thompson Ramo Wooldridge Inc., a corporation of Ohio Filed Dec. 2, 1953, Ser. No. 395,799

8 Claims. (Cl. 74—388)

The present invention relates to power steering systems, and, more particularly is concerned with the provision of power steering apparatus capable of installation in the modern automotive vehicle at an absolute minimum of cost by providing a power motor capable of direct attachment to a substantially conventional steering gear apparatus.

It is, of course, recognized that numerous mechanisms and apparatus for the purpose of providing a steering power assist, or power booster, have been created in the past. The present invention, however, contemplates the improvement of such power steering systems by providing a power motor requiring an absolute minimum of space while at the same time supplying a maximum of useable torque. By rearranging the association of the power motor unit with the manual steering column apparatus, a power steering assembly has been provided wherein the entire structure is adapted for enclosure within a single large housing. At the same time, the structure provided permits the change from a manual steering apparatus to a power steering apparatus by the addition of a few relatively simple parts which are readily securable to conventional apparatus with minimum of modification thereof.

In accordance with the concepts of the present invention, a dual acting reciprocating piston type power motor is provided in which hydraulic fluid under pressure is applied selectively against the outer or inner ends of a pair of pistons coordinated for simultaneous actuation of a gear shaft though rack and pinion connections. The gear shaft is in turn secured in axial alignment with the standard pitman arm shaft found in conventional steering gears. The dual acting motor is operated in response to a steering effort in either the right or the left hand direction, preferably through the use of a reciprocating control valve operable upon axial shifting of the steering shaft as a result of load applied to the reduction gearing between the steering shaft and the dirigible wheels.

The apparatus also contemplates the control of the dual acting hydraulic motor through a control valve which supplies fluid under a slight pressure to both sides of the actuating piston of said motor during the time in which the valve is in its neutral position. Thus, during such time as the source of power fluid is in operation, and the steering system is positioned for "as is," or unchanging stering operation, forces introduced by road shocks will be dampened by the bodies of fluid on opposite sides of the piston. This damping force has been found sufficient to substantially eliminate all feeling of impacts resulting from damaged road surfaces or the like, but will not prevent the automatic return of the vehicle to a straight ahead position from a turning position due to the forces resulting from the caster angle of the dirigible wheels. This is true since gradual shifting movement of motor pistons is permitted by the valve and motor combination disclosed herein.

It is, therefore, an object of the present invention to provide a novel power steering apparatus providing a maximum of power effort in a minimum space allotment.

Yet another object of the present invention is to provide a novel power steering apparatus in which the power source thereof is detachably secured to a conventional steering apparatus housing.

Still a further object of the present invention is to provide a combined steering gear and booster assembly having means associated therewith for accurately adjusting the various gear components.

Still another object of the present invention is to provide a novel combination manual and power operator for steering gears and the like.

Yet another object of the present invention is to provide a novel power motor comprising a single cylinder having a plurality of coaxially mounted pistons therein, each of the pistons being acted upon in both directions of movement by a hydraulic force to apply a forward or reverse power actuation of a single shaft.

A feature of the present invention is an adjusting mechanism whereby conventional steering gear adjustments may be made through the novel power motor without disassembly or modification thereof.

Another feature of the present invention is a simplified rack and gear pinion power motor.

Still a further object of the present invention is to provide an auxiliary power source for the application of a steering effort to a vehicle wherein the power source is directly attachable to previously installed manual steering system without significant alteration to the existing structure.

Still other and further objects and features of the present invention will at once become apparent to those skilled in the art from a consideration of the following description of the attached drawings, in which a preferred embodiment of the present invention is shown by way of illustration only; and wherein:

Figure 1 is an elevational view of the power system as a whole;

Figure 2 is a cross-sectional view showing details of the novel power motor of the present system and taken along the line II—II of Figure 1;

Figure 3 is a further cross-sectional view illustrating the interrelation of the parts of the present invention taken along the line III—III of Figure 2;

Figure 4 is a fragmentary sectional view of the novel motor arrangement of the present invention taken along the line IV—IV of Figure 1; and Figure 5 is a plan view in cross-section illustrating the novel control valve of the present invention and taken along the line V—V of Figure 1.

As shown on the drawings:

An overall view of the steering apparatus of the present invention may be found in Figure 1 wherein the operative parts thereof are shown. In that figure, a steering shaft 10 of the usual manual steering system and having a conventional steering wheel (not shown) at its extreme left hand end, is drivingly connected to a control valve structure 11 and, likewise, is drivingly associated with a pitman arm shaft generally indicated at 12 through reduction worm gearing. The pitman arm shaft 12 is secured to a conventional pitman arm 13 in the usual manner and the latter is in turn operatively associated with conventional steering linkage (not shown).

A power motor generally indicated at 15 is rigidly secured to the pitman shaft housing 14 and is hydraulically connected through the control valve 11 to a source of hydraulic fluid under pressure generally indicated at 16. The entire assembly comprising the steering shaft 10, the control valve 11, the pitman shaft housing 14 and the motor 15 is rigidly secured to the conventional frame of an automotive vehicle through an attachment flange 17. While the pump or pressure source 16 is not shown attached to the frame, it is to be understood that it may be so affixed at any convenient place adjacent the remainder of the apparatus.

As may clearly be seen from Figures 2, 3 and 4, the power motor 15 comprises a cylindrical housing 20 having circular pistons 21 and 22 mounted for reciprocation therein. The pistons 21 and 22 are provided with segmental axially extending extensions 23 and 24, respectively, carrying tracks 26 and 27 for engagement with the gear 28. The gear 28 is fixedly mounted on the shaft 29 which is in turn supported for rotation in the bushings 30 and 31.

The motor apparatus is very simply and economically constructed from a piece of standard tubing threaded at its ends 32 and 33 and apertured as at 34 and 35. A support member 36 is provided having a transverse bore therethrough for cooperation with the outer surface of the tube 20 and is apertured as at 37 and 38 in alignment with the respective bores 34 and 35 in the tube 20. As will be apparent from Figure 3, the assembly of the bushing 30 within the bores 34 and 37 and the assembly of the base 39 within the openings 35 and 38, respectively, will automatically lock the tube 20 to the housing 36 so that the tubing is prevented from axial movement relative to the housing 36 or to the gear shaft 29.

After the pistons 21 and 22 have been inserted and the caps 40, 41 screwed onto the ends of the tubing 20, the motor apparatus is bolted in any conventional manner, but preferably in the manner shown, by means of studs and nuts 42 to the pitman shaft housing 14. A shim 43, preferably of the laminated type, is provided between the base 39 and the housing 14 for purposes which will be described more fully below. The shaft 29 is provided with a shoulder 29a which abuts against the upper end of the bushing 31 and is maintained thereagainst by means of the adjustable pivot screw 45. In this manner the gear 28 is centered in its proper position and is provided with the proper amount of transverse freedom for bind-free operation.

Power applied to the shaft 29 by means of the pistons 21 and 22 is transmitted to the pitman arm shaft 12 by means of a T 29b cooperating with the T-slot 46 in the worm follower head 47 of the shaft 12. In order that proper adjustments may be made, the T-slot 46 is a snug fit with the T 29b, the cooperation of the parts 47 and the shaft 29 being such that substantially no relative movement axially is permitted. The axis of the shaft 12 and that of the shaft 29 are, of course, preferably identical so that rotation will be transmitted from the shaft 29 to the shaft 12 without any binding.

In view of the snug fit between the T 29b and the head 47, no thrust bearings are necessary to maintain the shaft 12 in its proper axial position relative to the housing 14. Thus, needle bearings 48 may be utilized with the shaft 12 to maintain it in an antifriction cooperation with the housing 14. Utilizing this arrangement, all adjustments in the relative position of the shaft 12 are made through the addition of or removal of shims 43 from between the housing 14 and the base 39.

The shaft 12, which may be rotated by means of a power input derived from the shaft 29, may also be manually actuated through a worm 50 of conventional design which is securely fixed to the steering shaft 10 for rotation and reciprocation therewith. The worm 50 cooperates with the roller 51 pivotally secured at 52 to the head 47 of the shaft 12. Thus, in the usual manner, rotation of the worm 50 will cause a movement of the roller 51 through an arc about the axis of the shaft 12, thereby causing a rotation of the shaft 12 to impart a steering movement to the pitman arm 13.

As may be seen from Figure 5, the worm 50 is mounted between sleeves 53 and 54. The sleeves provide the internal races for needle bearings 55 and 56 supported by the external housing 14, or parts rigidly secured thereto. As may be apparent, the bearings 55 and 56 do not prevent axial movement of the worm 50 and its shaft 10. Thus, upon the application of a torque to the shaft 10, as in the ordinary steering operation, the worm 50 will attempt to transmit the torque to the follower 51 of the shaft 12. Before the torque will be transmitted, however, the reaction at the follower 51, due to the resistive steering load, will cause the worm 50 to move axially in the direction opposite to the application of the torque. The torque required to cause this axial shifting movement may be varied through the use of centering springs in the manner to be described below and it is intended that the worm 50 shift axially upon the application of a torque from between 4 to 6 foot pounds at the steering shaft 10. In view of the slight axial movement permitted of the worm 50, a small amount of slack will appear in the steering wheel between initiation of the steering effort and the actual application of the force at the pitman arm 13. However, upon the absorption of the slack, a direct and positive manual steering effort is provided and, hence, in the event of failure of the hydraulic motor, the manual system may effectively be used. Thus, the addition of the power system for the steering has in no way eliminated its effectiveness or safety.

Axial movement of the worm 50 is utilized to advantage in the actuation of a control valve for the operation of the motor 15. This may clearly be seen from a consideration of Figure 5 wherein the spool valve 60 is shown in detail. The valve core 69 is axially immovable relative to the shaft 10 and is connected for axial movement with the worm 50 through the sleeve 53, the thrust bearings 61 and 62 and the retainer clip 63. Thus, in the usual system in which a counterclockwise rotation of the shaft 10 as viewed from the right in Figure 5, is intended to produce a right hand steering motion, and hence a counterclockwise rotation of the shaft 12, as viewed in Figure 5, rotation of the shaft 10 in the counterclockwise direction will cause a reaction of the worm 50 against the roller 51 causing the worm 50 to shift toward the right in that figure.

Right hand movement of the worm 50 will cause the shaft 10 to move toward the right through transmission of the force from the worm through the sleeve 54. In view of the provision of the retainer clip 63, movement of the shaft 10 toward the right will cause a simultaneous movement of the spool valve 60 through the thrust bearing 61.

Conversely, a clockwise rotation of the shaft 10 as viewed from the right in Figure 5, is intended to produce a left hand shifting of the worm 50 which will be transmitted to the spool valve 60 through the sleeve 53 and the thrust bearing 62.

Movement of the spool valve 60 in either direction away from the central balanced position shown in Figure 5 is opposed by the Belleville springs 64 and 65. These springs, in view of their direct bearing against the spool valve 60 which is in effective positive cooperation with the shaft 10 and worm 50, also provide opposition to shifting of the shaft 10 in response to steering torques. Thus, the springs 64 and 65 control the torque value at which the shaft 10 will move axially upon the application of a steering effort. Increase in strength of the springs 64 and 65 will, therefore, necessitate the application of a greater steering torque requirement before the power steering will provide assistance.

As stated above, the springs 64 and 65 are preferably of a strength to permit manual steering of the vehicle in instances requiring less than 4 to 6 foot pounds of steering torque. Thus, in cases where little steering effort is required, such as, for example, when the vehicle is under motion, most of the steering effort will be applied manually, while in situations where very heavy torque loads are required to steer the vehicle, such as when parking, only the 4 to 6 pounds torque will be supplied manually and the remainder, which is substantial, will be supplied by the hydraulic motor 15.

The control valve 60 operates to control the motor 15 by directly fluid under pressure entering the valve 11 through the conduit 70 from the pump or source 16. The fluid under pressure thus entering is distributed by the valve core 60 to the motor contraction or right-hand steering actuation direction by the conduit 71 or into the motor expansion, or left-hand steering actuation direction by the conduit 72. Fluid returns to the low pressure side of the pump 16 through the conduit 73.

As may be seen from a consideration of Figures 1, 2 and 5, fluid under pressure from the conduit 70 will, when the valve 60 is centered, flow equally into the annular grooves 74 and 75 of the core 60. Likewise, the fluid will flow equally from the valve grooves 74 and 75 to the two branches of the conduit 73, as well as through the apertures 76, 77 in the lands 78, 79 into the respective chambers 80 and 81. Provision of the apertures 76 and 77 permits the flow of fluid from the chambers 80 and 81 thereby preventing hydraulic lock of the valve core.

Upon movement of the valve core 60 toward the right, as viewed in Figure 1, in response to an attempt to turn the vehicle toward the right when more than a six pound steering torque is required, flow into the groove 75 will be cut off and will, instead, be directed solely to the groove 74. From the groove 74, the pressure will be applied to the motor contraction conduit 71 from whence the fluid flows to the branches 71a and 71b to force the pistons 21 and 22 toward the center of the cylinder 20, thereby causing a counterclockwise rotation of the gear 28, as viewed in Figure 4 and, hence, a counterclockwise rotation of the shaft 12 as viewed in Figure 5. Simultaneously, with the application of pressure to the outer walls of the pistons 21 and 22, the fluid between the pistons, and surrounding the gear 28 is vented to the reservoir conduit 73, through the conduit 72, the groove 75 and the branch 73b.

Movement of the valve core 60 toward the left in Figure 5, occasioned by steering rotation of the shaft 10 in a left-hand, or clockwise direction of rotation as viewed from the right in Figure 5, will reverse the connections of conduits above-described and cause fluid under pressure to be delivered from the conduit 70 to the groove 75 and from thence to the conduit 72. As may be seen from Figures 1 and 2, the conduit 72 is positioned intermediate the pistons 21 and 22 and the application of fluid under pressure to this space causes the pistons 21 and 22 to expand and hence move toward the ends 40 and 41 respectively, of the cylinder 20. As in the right hand steering operation described above, the opposite conduit 71 is vented to the reservoir conduit 73, thereby relieving the fluid pressure between the pistons 21 and 22 and the respective ends 40 and 41 of the motor.

By providing the dual piston, single cylinder motor arrangement shown, a maximum power effort is obtainable in a minimum space. This will be evident when the forces are considered. For example, the fluid pressure delivered to the conduit 71 will be applied to an area twice the size of a single piston, urging both the pistons 21 and 22 toward the gear 28. In ordinary power motors the pressure is, instead, delivered against only a single piston 21, or possibly against a plurality of pistons 21 in separate cylinders. In reverse movement, pressure is applied between the two pistons 21 and 22 urging them both outwardly to the same degree, thus again applying twice the steering effort available in the ordinary single piston construction.

While this double force is provided, it will be apparent that the space required for the effort is substantially no greater than that ordinarily required for single power cylinder construction and the number of additional parts required is an absolute minimum, namely being only the addition of a single piston within the confines of an already constructed cylinder.

Thus, through the provision of a single piston part arranged in the manner herein disclosed, applicant has been enabled to provide a power motor having high torque capacity in a minimum of space. This minimization of space requirement has greatly increased the value of the entire system since it permits its installation in substantially any conventional automobile. As those familiar with the field are aware, space is becoming more and more at a premium under the hood of an automotive vehicle and the provision of a small, high torque motor which will operate at relatively low pump pressures, will greatly aid in the reduction in size, and hence increase the possible uses, of the power steering system.

It will be understood that aside from the magnification of the forces applied, the balanced, opposed, piston arrangement herein shown also provides an extremely long lived motor apparatus. This is true, since forces applied to the gear 28 will be in all cases applied simultaneously to opposite sides of the gear, thereby providing a substantially balanced bearing load at the shaft 29. This balance is important since it prevents wear and thus increases the life of the O-ring seals 85 and 86. In view of the extremely hard usage given automotive vehicles, and the large numbers of cycles of operation required of the motor 15, this feature is an extremely important one in actual practice.

An important feature of the present invention is the relationship of the motor 15 to the pitman arm shaft housing 14 and to the shaft 12 itself. As may be seen clearly from Figures 3 and 2, the motor 15 is attached directly to the top of the housing 14. In most instances this attachment may be accomplished merely by removing the conventional cover plate from the housing 14, provided with the usual manual system, and attaching the motor 15 thereto in its place. In the initial manufacture of the steering vehicle, a pitman shaft 12 is provided having a slot 46 in the head 47 thereof and, when the power motor is to be applied, the shaft 12 is merely raised relative to the housing 14 until the T 29b may be laterally inserted in the slot 46, at which time the shaft 12 is moved downwardly and the motor 15 is bolted down to the housing 14.

As is well known in the art, the position of the roller 51, and hence of the shaft 12 is relatively critical. This is true since as may be seen in Figure 2, movement of the roller 51 downwardly causes it to mesh more deeply with the worm 50, thereby providing a wear take-up. This take-up is conventional, but ordinarily it is accomplished through a direct adjustment of the shaft 12. In the present instance, the motor 15 will, of course, interfere with any direct adjustments on the shaft 12, and hence provision is made for adjustment through the motor itself. This adjustment is accomplished by means of the shim 43, which is preferably of a laminated type.

By adding or subtracting material from the shim 43, the shaft 12 may readily be adjusted relative to the axis of the worm 50, thereby providing the necessary adjustment. As had been explained above, movement of the shaft 12 upwardly is prevented by means of the adjusting screw 45, thereby providing a snug steering system. It will be noted in this connection that adjustment may be made of the position of the shaft 12 and hence the cam follower 51, without alteration or adjustment of the motor parts which factor is, of course, important since critical dimensions within the cylinder 15 are eliminated and service adjustments are relatively simple.

It will thus be apparent that I have provided a novel power steering system and motor therefor which is capable of providing a maximum steering torque at a minimum space and pump pressure. Further, the apparatus of the present invention may readily be substituted for the cover plate of a substantially conventional steering apparatus so that the power steering system of the present invention may be provided as "optional equipment" without the addition of a large number of parts.

While the control valve 11 in the present installation is shown positioned on the steering wheel side of the worm 50, it will be apparent from a consideration of Figure 5 that the valve 11 may be positioned on an extension of the shaft 10, on the opposite side of the worm 50, if so desired. In such an installation, the shaft 10 is merely provided with an extension and the housing 10 is fixedly secured to the housing 14 on the opposite side from that herein shown. In some cases, this reversal of parts is found desirable for reasons of space limitations and it may be found that the addition of valve 11 to the extremity of the shaft 10 renders substitution of the power system into the ordinary mechanical arrangement less difficult.

It will be apparent that variations and modifications may be made in the above-described structure without departing from the scope of the novel concepts of the present invention.

I claim as my invention:

1. A power steering system comprising a pitman shaft housing having a pitman shaft and a steering shaft mounted therein at angles to each other, reduction gearing connecting said shafts, a power motor removably secured as a unit to said housing and having an output shaft axially aligned with and detachably connected to said pitman shaft for the actuation thereof in response to a predetermined steering effort, and means operatively connected with said output shaft for adjusting the axial position of said pitman shaft through said detachable connection.

2. A power steering system comprising a pitman shaft housing having a pitman shaft and a steering shaft mounted therein for cooperation with each other, reduction gearing connecting said shafts, said steering shaft being mounted for reciprocation in said housing and being shiftable axially upon the application of a steering force through said reduction gearing to said pitman shaft as a result of the reaction on said gearing of said steering force, and a power motor removably secured to said housing, said motor having an output shaft positioned in axial alignment with and removably connected to said pitman shaft by a separable, rigid connection for the actuation thereof in response to a predetermined steering effort sensed by reciprocation of said steering shaft.

3. A power steering system comprising a pitman shaft housing having a pitman shaft and a steering shaft mounted therein, reduction gearing connecting said shafts and a power motor removably secured as a unit to said housing and removably connected to said pitman shaft for the actuation thereof, said pitman shaft having a T-slot connection with the power shaft of said motor, and means for providing an adjustment of the relative positions of said motor and said housing whereby the position of said pitman shaft may be adjusted to provide proper reduction gearing clearances.

4. A power steering system comprising a housing having a pitman shaft and a steering shaft mounted therein, reduction gearing connecting said shafts for simultaneous rotation, first means supporting said steering shaft for reciprocation within said housing, second means rigidly securing a reduction gear on said steering shaft, and third means directly connecting said reduction gear to a control valve whereby reciprocation of said steering shaft will actuate said control valve, a power motor removably secured to said housing and associated with said pitman shaft, the power shaft of said motor and the pitman shaft lying on the same axis and being connected by an axially and rotationally rigid detachable joint, and a source of power connected through said control valve and the power motor to said pitman shaft.

5. A power steering apparatus comprising a pitman shaft housing having a pitman shaft and a steering shaft mounted therein for geared cooperation with each other, reduction gearing connecting said shafts, and a power motor removably secured to said housing and having its output shaft coaxially connected to said pitman shaft for the rotation thereof in response to a predetermined torque applied to said steering shaft, said power motor comprising a cylinder mounted in position with its axis substantially perpendicular to said pitman shaft, a transverse shaft in said cylinder, said transverse shaft having means on one end thereof forming an axially and rotationally rigid driving connection with said pitman shaft, a pair of opposed pistons coaxially mounted in said cylinder in complementary driving connection with said transverse shaft, each of said pistons having a rack integrally formed thereon and straddling a pinion secured on said transverse shaft, and means associated with said transverse shaft for adjusting said transverse shaft axially.

6. A power steering apparatus comprising a pitman shaft housing having a pitman shaft and a steering shaft mounted therein for geared cooperation with each other, reduction gearing connecting said shafts, and a power motor removably secured to said housing and having its output shaft coaxially connected to said pitman shaft for the rotation thereof in response to the application of a predetermined torque to said steering shaft, said power motor comprising a cylinder mounted with its axis substantially perpendicular to said pitman shaft, a transverse shaft in said cylinder, said transverse shaft having means on one end thereof for cooperation with and driving connection with said pitman shaft, and a pair of opposed pistons coaxially mounted in said cylinder in complementary driving connection with said transverse shaft, said complementary connection comprising a gear secured to said transverse shaft and a segmental rack secured to each of said pistons and cooperating with said gear on opposite sides thereof whereby movement of said pistons toward each other will actuate said shaft in one direction and movement of said pistons in the opposite direction will cause reverse rotation thereof, each of said segmentary racks being rigidly secured to its respective piston and having a segmental cylindrical surface disposed oppositely from the portion of the rack carrying teeth and in reciprocating, guiding, association with the wall of said cylinder.

7. A power steering system comprising a pitman shaft housing having a pitman shaft and a steering shaft mounted therein, reduction gearing connecting said shafts and a power motor removably secured as a unit to said housing and removably connected to said pitman shaft for the actuation thereof, said pitman shaft having a rigid separable connection with the power shaft of said motor for axial and rotational movement therewith, and means for providing an adjustment of the relative positions of said motor and said housing whereby the position of said pitman shaft may be adjusted to provide proper reduction gearing clearances.

8. A compact balanced high force output fluid pressure motor comprising a housing having a continuous cylindrical bore therethrough, a shaft rotatably mounted on an axis transverse to said bore and intersecting the longitudinal axis thereof, bearing means in said housing supporting said shaft, gear teeth on said shaft, said teeth having a length axially of the shaft a major fraction of the diameter of the bore, a pair of axially reciprocable piston heads slidably mounted in said bore on axially opposite sides of said shaft, each of said pistons having rigid therewith a rack extending axially of said bore toward the other piston and in straddle relation to said shaft, said bearings being positioned out of the axial path of said racks, each of said racks having a width complementing the length of said teeth and having a segmental cylindrical surface on the side thereof opposite from said shaft, which surface has a diametrical arc substantially the same as the external surface of said pistons for sliding bearing co-operation with said bore through an area thereof between said pistons including axially opposite sides of said shaft whereby said opposed piston heads and racks have a bearing contact with axially overlapping portions of the internal surface of said cylindrical bore and are maintained in alignment, and whereby forces applied to said piston heads will be transferred to said shaft in a balanced manner, and means selectively applying a fluid force to the sides of said piston head remote from said shaft or, alternatively, the sides of said pistons facing said shaft.

References Cited in the file of this patent

UNITED STATES PATENTS

| | | |
|---|---|---|
| 955,896 | Morrison | Apr. 26, 1910 |
| 1,035,899 | Pearson | Aug. 20, 1912 |
| 1,667,559 | McCaleb | Apr. 24, 1928 |
| 1,914,267 | Leupold | June 13, 1933 |
| 2,408,338 | Parsons | Sept. 24, 1946 |
| 2,410,049 | Davis | Oct. 29, 1946 |
| 2,433,990 | Hardy | Jan. 6, 1948 |
| 2,626,527 | Meyers | Jan. 27, 1953 |
| 2,688,258 | Haynes et al. | Sept. 7, 1954 |